350-3.82 SR
XR 3,862,357
X 3057 N
(2)

United States Patent

Kanazawa et al.

[11] 3,862,357

[45] Jan. 21, 1975

[54] HOLOGRAM RECORDING AND RECONSTRUCTING SYSTEM

[75] Inventors: Yasunori Kanazawa; Hiroshi Takano, both of Tokyo, Japan

[73] Assignee: Hitachi, Ltd., Tokyo, Japan

[22] Filed: May 18, 1973

[21] Appl. No.: 361,420

[52] U.S. Cl............. 178/6.8, 350/3.5, 350/162 SF, 358/2

[51] Int. Cl........................... H04n 1/22, G02b 5/18

[58] Field of Search........... 350/3.5, 162 SF; 358/2; 178/6, 6.8

[56] References Cited

UNITED STATES PATENTS

| | | | |
|---|---|---|---|
| 3,649,754 | 3/1972 | Macovski | 350/3.5 |
| 3,650,595 | 3/1972 | Gerritson | 350/3.5 |
| 3,659,914 | 5/1972 | Brooks | 350/162 SF |
| 3,677,616 | 7/1972 | Lewis | 350/3.5 |
| 3,746,455 | 7/1973 | Flamholz | 350/162 SF |

*Primary Examiner*—Howard W. Britton
*Assistant Examiner*—Michael A. Masinick
*Attorney, Agent, or Firm*—Craig & Antonelli

[57] ABSTRACT

A Fourier transform hologram recording and reconstructing system in which, during recording, an object is illuminated by light which is defracted by a diffraction grating and contains only high spatial frequency components and, during reconstruction, light excluding said spatial frequency components is used.

20 Claims, 7 Drawing Figures

3862357
NO ORI CLASSIF

HOLOGRAM RECORDING AND RECONSTRUCTING SYSTEM

BACKGROOUND OF THE INVENTION

The present invention relates to generally a hologram recording and reconstructing system and, more particularly, to a holographic system for reconstructing an image with high quality.

DESCRIPTION OF THE PRIOR ART

Holography is largely different from ordinary photography in that the three-dimensional information may be recorded because all of the information in the wave fronts of light reflected from or transmitted through an object is recorded and the density distribution over a hologram does not correspond to that of the object. In other words, the information of a given point on an object may be distributed over the whole surface of a recording medium so that the redundancy of information may be increased. The original information may be completely reproduced even when a part of a recording medium or hologram with high information redundancy is deteriorated or damaged. This provides high stability of the recorded information.

From the underlying principle of holography that wave fronts are recorded, image conversion may be effected and recorded. Therefore, Fourier-transform holography is of most importance in practice. In Fourier-transform holography the image position of a reconstructed image remains immobile even when a hologram is displaced. This is the most important feature in recording and reconstructing the holographic memories and movies.

Holography offers the idealistic recording techniques as described above, but it has an inherent defect that the quality of its image is poor as compared with the image obtained by the ordinary photography, because a disturbance in phase in the optical path and the random reflections from an object present noise components in the recorded image. When it is desired to record an object or information with high redundancy, it is necessary to illuminate the object from various directions. For this purpose a diffuser, such as a ground glass plate has been employed, but the interference between the irregularly diffused light beams causes the so-called speckle noise, thus resulting in a decrease in the signal-to-noise ratio of the reconstructed image. To overcome this problem, there has been proposed a system in which an object is illuminated by light which is transmitted through a diffraction grating, but this method also has an inherent defect that the grating image is reconstructed together with the image of the object, so that the image quality is not satisfactory.

SUMMARY OF THE INVENTION

One of the objects of the present invention is to provide a hologram recording and reconstructing system which may improve the signal-to-noise ratio, thereby providing a high quality image.

Briefly stated, the hologram recording and reconstructing system in accordance with the present invention is characterized in that during recording, an object is illuminated by light consisting of a spatial frequency higher than the maximum spatial frequency contained in the object or by light consisting of a spatial frequency excluding a predetermined spatial frequency band and, during reconstruction, light excluding said spatial frequency components is used.

The above and other objects, features and advantages of the present invention will become more aaparent from the following description of preferred embodiments thereof taken in conjunction with the accompanying drawings.

DESCRIPTION OF THE PREFERRED EMBODIMENTS

Figure 1A:
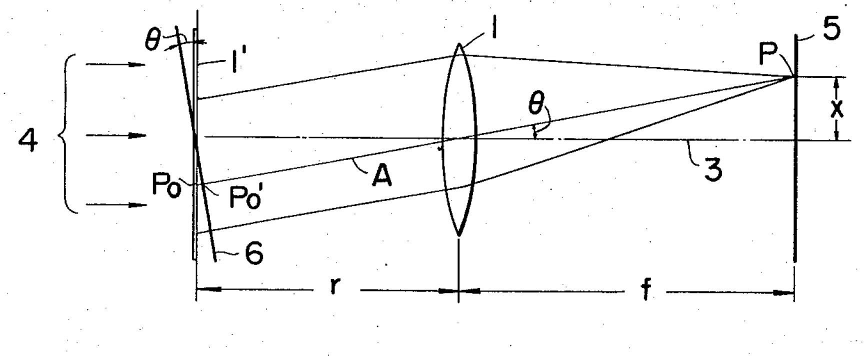
FIGS. 1*a* and 1*b* are diagrams used for the explanation of a Fourier transform effected through a lens.
Figure 1B:
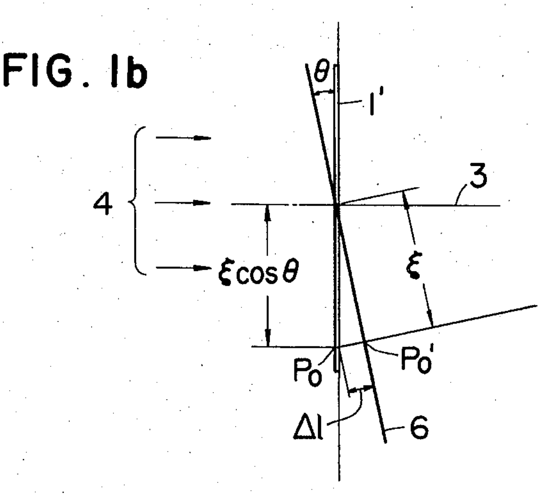

FIG. 1*a* is a view of an optical system for obtaining a light beam with a relatively high spatial frequency component and FIG. 1*b* is a fragmentary view thereof, on an enlarged scale, illustrating the relation between the object plane and a wave front. An object plate 1' in the spatial domain of a lens 1 is illuminated by plane-wave light 4 travelling in a direction parallel with the optical axis 3. The plane-wave light 4 is diffracted by an information pattern placed upon the objective plane 1' and is Fourier-transformed by the lens 1 in a manner well known in the art, so that a pattern with a spatial spectrum distribution of the objective plane 1' is focused upon a focal plane 5 in the image plane of the lens 1.

Assume that light diffracted by an angle $\theta$ relative to the optical axis 3 is incident on the lens 1 and is focused upon the focal plane 5 at P. The wave front 6 of the parallel light rays in the object space is at an angle $\theta$ relative to the object plane 2 so that the following relation is established:

$$\begin{aligned} l &= \sqrt{r^2+\epsilon^2\cos^2\theta} + \sqrt{f^2+x^2} \\ &= r+f+(x^2/2f)\,[1-(r/f)] \end{aligned} \quad (1)$$

where $l$ = the distance between the point $P$ and the point $Po'$ where the chief or principal ray A intersects the wave front 6, and $\theta$ is assumed to be sufficiently small. Since the distance $\Delta l$ between the object plane 1' and the wave front 6 along the chief or principal ray A is given by $$\Delta l = \xi \sin\theta = (\xi x/f) \quad (2)$$

the distance L between the point $Po$ on the object plane 1' and the point $P$ on the focal plane 5 is given by $$\begin{aligned} L &= l + \Delta l \\ &= r+f+(x^2/2f)\cdot[1-(r/f)]+(\xi x/f) \end{aligned} \quad (3)$$

Equation (3) may be two-dimensionally expanded as follows:

$$L = r + f + (x^2 + y^2/2f) \cdot [1 - (r/f)] + (\xi x/f) + (ny/f) \quad (4)$$

Substituting Equation (4) into the well known Fresnel-Kirchhoff diffraction integral, we have the amplitude distribution $u\ (P)$ over the focal plane 5 in image space $$u(P = K \exp\left\{ik\left(1-\frac{r}{f}\right)\frac{x^2+y^2}{2f}\right\} \iint_{-\infty}^{+\infty} g(\xi x) \cdot \exp\left\{ik\left(\frac{\xi x}{f}+\frac{ny}{f}\right)\right\} \cdot d\xi d\eta \quad (5)$$

where $K$ = a constant, and $g\ (\xi\ \eta)$ = amplitude transmittance distribution on the object plane 1'.

Equation (5) generally represents the so-called Fraunhoffer diffraction, and shows that a pattern upon the object plane 1' with the amplitude transmittance distribution $g\ (\ \xi,\ \eta)$ is Fourier-transformed and focused upon the focal palne 5 in the image space of the lens 1. Therefore, in order to obtain the spectra of $g\ (\ \xi,\ \eta)$, Equation (5) may be rewritten in the form of $$u\ (P) = K \exp\ \{\ i\ K\ [1-(r/f)]\ (x^2 + Y^2\ /2f)\ \}\ G\ (s, t) \quad (6)$$

where $s$ and $t$ are the measure of the spatial frequency and given by $x = \lambda\ f\ s$ $y = \lambda\ f\ t$ where $\lambda$ = wavelength of light (7)

Of light rays diffracted by the object plane 1' the light rays with the low spatial frequency component are concentrated toward the optical axis whereas the light rays with the high frequency component are spaced apart from the optical axis. According to the present invention, during recording, an object is illuminated by light only with the high spatial frequency component obtained by blocking light with the low spatial frequency component.

When the cutoff frequency is selected to be higher than a required frequency band of an image, the quality of the reconstructed image will not be degraded even when the high spatial frequency component is removed by an optical filter, and the recording with high redundancy may be attained.

Figure 2:
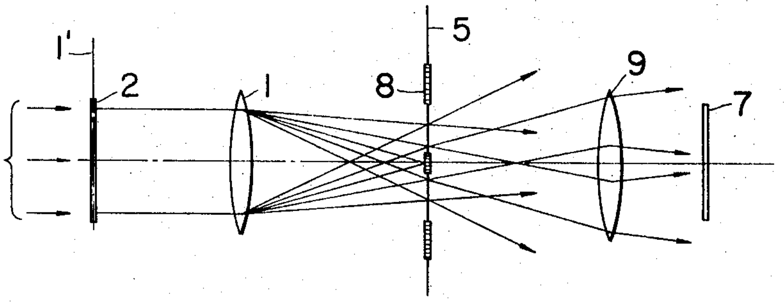
FIG. 2 is a diagram used for the explanation of the major components of an optical instrument used in the present invention.
Figure 3:
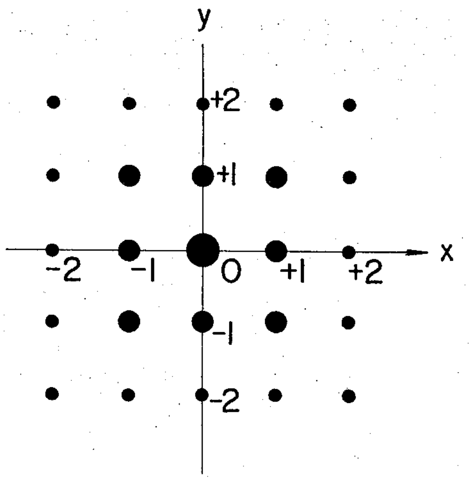
FIG. 3 is a view used for the explanation of a Fourier transform pattern obtained by an orthogonal diffraction grating.

Next referring to FIG. 2 illustrating the optical system for recording a holographic image in accordance with the present invention, an orthogonal diffraction grating 2 is positioned in the object plane 1' so that a Fourier-transformed pattern of the diffraction grating is focused upon the focal plane 5 in the image space of the lens 1 as shown in FIG. 3.

In FIG. 3, the light spot at the original point (0,0) represents the 0th order light and corresponds to the DC component, whereas eight spots (+1,0), (−1,0), (0, +1), (0, −1), (+1, +1), (−1, +1), (+1, −1) and (−1, −1) are the 1-st order diffracted light and correspond to the fundamental period of the diffraction grating. The spots surrounding the spots of the 1-st order diffracted light are the 2-nd order diffracted light and correspond to the second harmonic of the fundamental period. In like manner the spots of the diffracted light of higher order are distributed.

Figure 4:
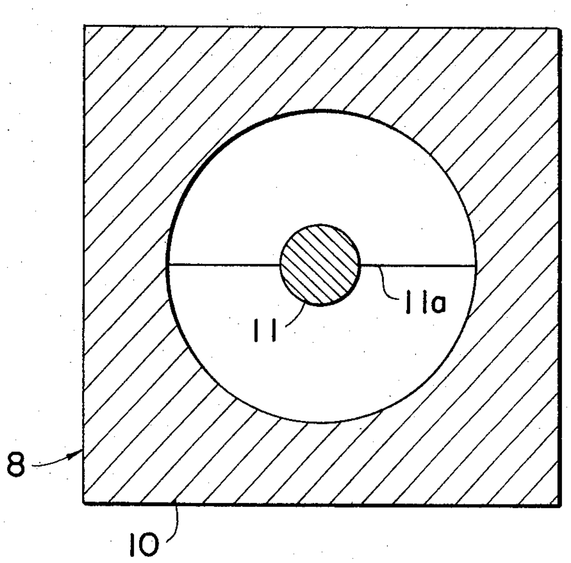
FIG. 4 is a view of a light blocking mask used for filtering a predetermined spatial frequency.

Referring back to FIG. 2, a blocking mask 8 of the type comprising an outer light blocking plate 10 and a circular inner blocking disk 11 (See FIG. 4) is positioned in the focal plane 5 in the image space of the lens 1 so that the low frequency component may be cut off. The light rays transmitted through the blocking mask 8 are condensed by a lens 9 to illuminate an object 7 with light rays with the high spatial frequency component and having wave fronts oriented in the different directions.

Referring back to FIG. 4, the inner circular blocking disk 11 is supported by arms **11*a* by the outer blocking plate 10, but these arms 11*a* may be eliminated when a blocking mask is made by printing the outer and inner blocking masks upon a photographic plate. The outer blocking plate 10** may be eliminated when the diffracted light rays of the higher order and the scattered light rays will not adversely affect the formation of a holographic image.

The diameter of the inner circular disk 11 may be determined, when a required resolution is given, from Equation (7). For example, when the required resolution is 40 lines/mm at a wavelength of 6,328 A (He-Ne gas laser light) and the focal length of the lens 1 is 200 millimeters, the diameter of the inner circular disk 11 is 5 millimeters.

If the spatial frequency of the orthogonal diffraction grating placed in the object plane 1' is higher than that corresponding to a required resolution, that is when the magnitudes of $x$ and $y$ given by Equation (7) are greater, the distance between the adjacent orders is increased, so that the inner circular disk 11 serves only to mask the 0th order light. On the otherhand when the spatial frequency of the orthogonal diffraction grating is lower than that corresponding to a required resolution, the inner circular disk 11 serves to mask even the high order diffracted light waves. It is, therefore, necessary to determine a diameter of an inner circular disk 11 in such a way that the light rays of up to a required order may be masked or blocked.

Instead of the orthogonal diffraction grating of the the type described above, a light diffusing element such as a random phase shifter or diffusion plate may be used; but it should be noted that a pattern focused upon the focal plane 5 in the image space of the lens 1 is not sharp, unlike the pattern in FIG. 3, but is continuously shaded off.

Figure 5:
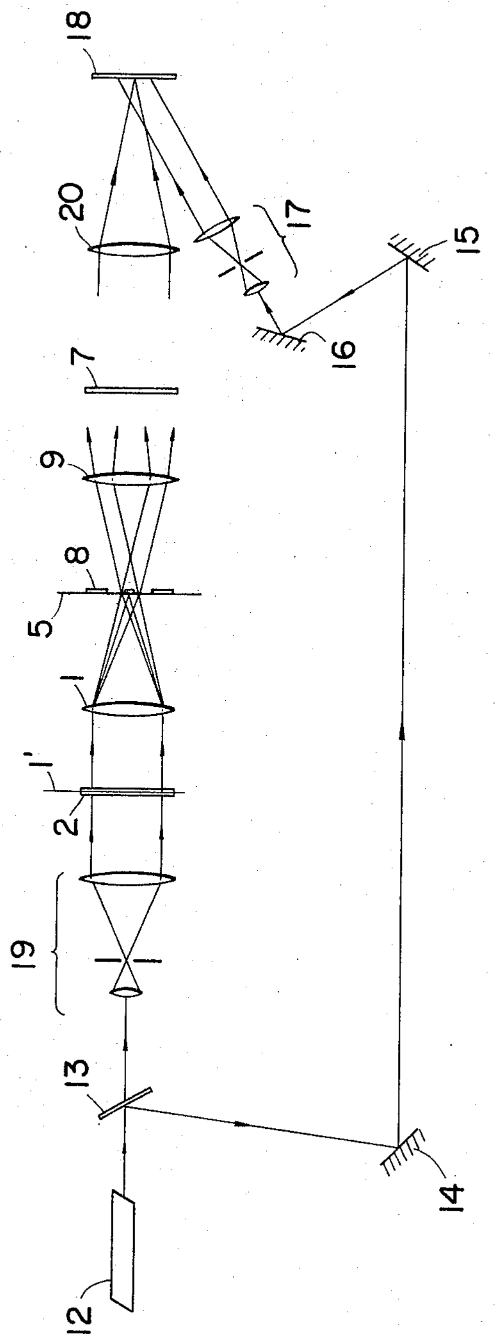
FIG. 5 is a schematic diagram of an optical system for recording a Fourier-transform hologram in accordance with the present invention.

Next, referring to FIG. 5, there is illustrated an optical system for recording holographic images in accordance with the present invention, the system incorporating the optical system of the type described with reference to FIG. 2. The light beam emitted from a laser light source 12 is split into reflected and transmitted beams by a silver-plated half mirror 13. The reflected laser beam is transmitted to a collimator lens system 17 including a pin hole through reflecting mirrors 14, 15 and 16. In the collimator lens system 17 the diameter of the incident laser beam is increased to a predetermined beam diameter, and then the laser beam is made incident upon a photographic emulsion 18 as the reference beam.

The laser beam transmitted through the half mirror 13 is directed toward a collimator lens system 19 including a pin hole so that the laser beam with a predetermined beam diameter may be incident upon the diffraction grating or diffusion plate 2 placed in the object plane 1' of the lens 1. The diffracted or diffused light beam is made incident upon the lens 1, so that a pattern of the spectral distribution of the diffraction grating or diffusion plate 2 is focused upon the focal plane 5. The low spatial frequency component is cut off by blocking mask 8 placed in the focal plane 5 in the manner described above, and the light rays emanating from the blocking mask 8 are condensed by the lens 9 so as to illuminate the object 7. The light waves emanating from the object 7 are Fourier-transformed by a lens 20 and focused upon the photographic emulsion 18 as the object beam.

Since the orthogonal diffraction grating 2 is placed in the object plane 1' of the lens 1, the distribution of the object beam upon the photographic emulsion 18 comprises a convolution of the amplitude transmittance distribution (or phase deviation distribution) of the orthogonal diffraction grating 2 and the distribution of the information on the object 7. That is, the information on the object 7 is recorded in the form of the sidebands of the light spots which are distributed as shown in FIG. 3.

Figure 6:
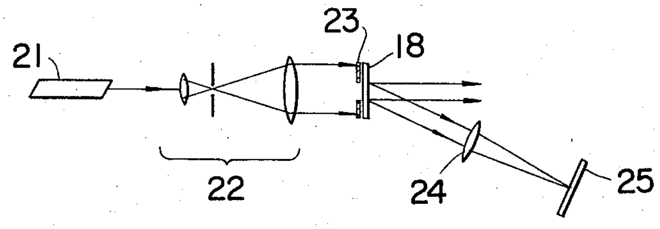
FIGS. 6 and 7 are views illustrating hologram reconstructing systems in accordance with the present invention.

The holographic image recorded in the manner described above with reference to FIG. 5 may be reconstructed by the optical system shown in FIG. 6. The laser beam emitted from a laser light source 21 is directed to a collimator lens system 22 including a pin hole, so that the laser beam having a predetermined beam diameter may be incident upon the hologram 18 (that is the photographic emulsion having the information on the object 7 recorded thereupon).

A blocking mask 23 having a circular aperture is located immediately below or after the hologram 18 so that the band limit in the Fourier transform plane may be effected, that is, the high spatial frequency component may be cut off. When the high spatial frequency component, cut off during reconstruction of the image, is so determined as to correspond to the low spatial frequency component cut off during recording, the pattern of the orthogonal diffraction grating may be prevented from being focused to be superposed upon the reconstructed image.

Figure 7:
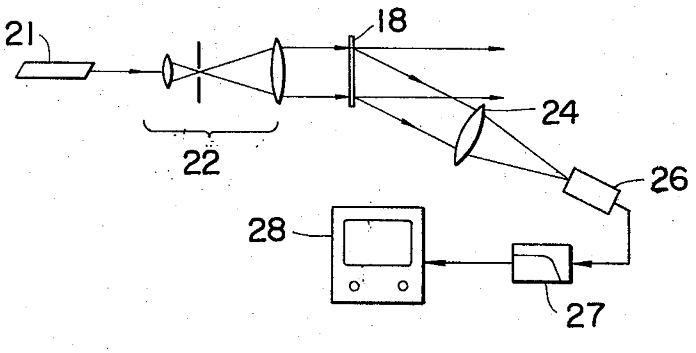

A portion of the light waves transmitted through the hologram 18 is the 0th order diffracted light ray and is directed straight ahead, but other light waves including the 1st order diffracted light ray contributes to reconstruct the image. That is, the 1st order diffracted light rays are focused by a lens 24 upon a screen 25 to reconstruct the image. Alternatively, the light rays emanating from the hologram 18 may be focused upon a television camera 26 as shown in FIG. 7, but the blocking mask 23 must be removed and a low-pass filter 27 must be inserted in an electric circuit so that the pattern of the grating may be removed out of the output signals from the television camera 26 when a reconstructed image is displayed by a television receiver 28. However, it should be noted that when the blocking mask 23 is inserted, the low-pass filter 27 may be eliminated. Furthermore, if the power of resolution of an image pickup tube is equal to or less than a required resolution, the optical blocking mask 23 or low-pass filter 27 may be eliminated.

As described hereinbefore, according to the present invention, during recording of a holographic image, an object to be recorded is illuminated only by light rays of a relatively high spatial frequency component and, during reconstruction, light excluding the higher spatial frequency component us used. Therefore, a high quality holographic image may be recorded without the sacrifice of redundancy. Thus, the present invention provides a very advantageous hologram recording and reconstructing system.

We claim:

1. In a method of recording a hologram of an object which includes the steps of:

a. separating a beam of light into a first beam and a second beam, b. directing said first beam onto an object, the hologram of which is to be recorded, to thereby provide an object beam, c. passing said object beam through a Fourier-transform lens which focuses said object beam upon a hologram recording medium, and d. directing said second beam, as a reference beam, onto said hologram recording medium to interfere with said object beam on said medium and form a hologram of said object thereon;

reconstructing an image of said object from said hologram by the step of e. illuminating said hologram recorded on said hologram recording medium with a reconstruction light beam, to thereby form a reconstructed image of said object, the improvement wherein step (a) includes the step of selectively filtering out a predetermined spatial frequency band from said first beam, to that said first beam which is directed onto said object illuminates said object without said predetermined spatial frequency band; and step (e) includes the step of illuminating said hologram recorded on said hologram recording medium with a reconstructing beam of light which includes said predetermined spatial frequency band.

2. A method according to claim 1, wherein said predetermined spatial frequency band corresponds to the 0th order component of said beam of light.

3. The improvement according to claim 1, wherein said step of selectively filtering out a predetermined spatial frequency band from said first beam comprises the steps of:

a1 . directing said first beam onto a diffusion plate to thereby produce a diffused light beam, a2. passing said diffused beam through a first lens, a3. selectively intercepting at least one spatial frequency component of the diffused light beam at the image palne of said first lens, and a4. passing the components of the beam remaining after the selective interception carried out in step (a3) to a further lens for subsequent direction onto said object in step (b).

4. The improvement according to claim 1, wherein step (e) includes the step of removing spatial frequency components outside said predetermined spatial frequency band from said reconstructing beam oflight prior to its illuminating said hologram.

5. The improvement according to claim 1, wherein step (e) includes the steps of e1. focusing the light rays emanating from said hologram resulting from the illumination thereof with said reconstruction beam onto an image pickup tube, e2. selectively filtering the output of said image pickup tube to remove frequency components thereof outside said predetermined spatial frequency band, and e3. reproducing the selectively filtered output of said image pickup tube on a television receiver.

6. The improvement according to claim 1, wherein step (e) includes the steps of e1. removing spatial frequency components outside said predetermined spatial frequency band from said reconstructing beam of light prior to its illuminating said hologram, e2. focusing the light rays emanating from said hologram resulting from the illumination thereof with said reconstruction beam onto an image pickup tube, and e3. reproducing the output of said image pickup tube on a television receiver.

7. The improvement according to claim 1, whereing step (e) includes the steps of e1. focusing the light rays emanating from said hologram resulting from the illumination thereof with said reconstruction beam onto an image pickup tube, and e2. reproducing the output of said image pickup tube on a television receiver.

8. The improvement according to claim 1, wherein said step of selectively filtering out a predetermined spatial frequency band from said first beam comprises the steps of:

a1. directing said first beam onto a diffraction grating to thereby produce a diffracted light beam, a2. passing said diffracted light beam through a first lens, a3. selectively intercepting at least one spatial frequency component of the diffracted light beam at the image plane of said first lens, and a4. passing the components of the beam remaining after the selective interception carried out in step (a3) to a further lens for subsequent direction onto said object in step (b).

9. The improvement according to claim 8 wherein step (e) includes the step of removing spatial frequency components outside said predetermined spacial frequency band from said reconstructing beam of light prior to its illuminating said hologram.

10. In a method of recording a hologram of an object which includes the steps of:

a. separating a beam of light into a first beam and a second beam, b. directing said first beam onto an object, the hologram of which is to be recorded, to thereby provide an object beam, c. passing said object beam through a Fourier-transform lens which focuses said object beam upon a hologram recording medium, and d. directing said second beam, as a reference beam, onto said hologram recording medium to interfere with said object beam on said medium and form a hologram of said object thereon; and reconstructing an image of said object from said hologram by the step of e. illuminating said hologram recorded on said hologram recording medium with a reconstruction light beam, to thereby form a reconstructed image of said object;

the improvement wherein step (a) includes the step of selectively filtering out a predetermined lower order spatial frequency band from said first beam, so that said first beam which is directed into said object illuminates said object with a higher order spatial frequency band excluding said predetermined lower order spatial frequency band; and step (e) includes the step of illuminating said hologram recorded on said hologram recording medium with a beam of light from which said higher order spatial frequency band has been excluded.

11. In a system having a hologram recording portion for recording a hologram of an object and a reconstruction portion for reconstructing an image of said object from said hologram, the hologram recording portion comprising:

first means for providing a beam of coherent light;

second means for separating said beam of light into a first beam and a second beam, third means for directing said first beam onto an object, the hologram of which is to be recorded, to thereby provide an object beam, a Fourier-transform lens receiving said object beam and focusing said object beam onto a hologram recording medium, and fifth means for directing said second beam, as a reference beam, onto said hologram recording medium, to interfere with said object beam on said medium and form a hologram of said object thereon; and the reconstruction portion comprising sixth means for illuminating said hologram recorded on said hologram recording medium with a reconstruction light beam, to thereby form a reconstructed image of said object;

the improvement wherein said second means includes means for selectively filtering out a predetermined spatial frequency band from said first beam, so that said first beam, which is directed onto said object by said third means, illuminates said object without said predetermined spatial frequency band; and said sixth means includes means for illuminating said hologram recorded on said hologram recording medium with a recontructing beam of light which includes said predetermined spatial frequency band.

12. The improvement according to claim 11, wherein said second means includes a diffraction grating disposed in the path of said first beam for providing a diffracted light beam, a first lens receiving said diffracted light beam, a spatial filter disposed in the object plane of said first lens for selectively filtering out said predetermined spatial frequency band from said diffracted light beam, and a second lens disposed between said spatial filter and said object.

13. The improvement according to claim 11, wherein said second means includes a diffusion plate disposed in the path of said first beam for producing a diffused light beam, a first lens receiving said diffused light beam, a spatial filter disposed in the object plane of said first lens for selectively filtering out said predetermined spatial frequency band from said diffused light beam, and a second lens disposed between said spatial filter and said object.

14. The improvement according to claim 11, further including seventh means for focusing the light rays emanating from said hologram resulting from the illumination thereof with said reconstruction beam onto an image pickup tube, eighth means for filtering the output of said image pickup tube to remove frequency components thereof outside said predetermined spatial frequency band, and a television receiver for displaying the output of said eighth means.

15. The improvement according to claim 14, wherein said eighth means comprises a low pass filter.

16. The improvement according to claim 11, further including seventh means for focusing the light rays emanating from said hologram resulting from the illumination thereof with said reconstruction beam onto an image pickup tube, and a television receiver for displaying the output of said eighth means.

17. The improvement according to claim 16, wherein the power of resolution of said image pickup tube is such that the output thereof has spatial frequency components lying outside said predetermined spatial frequency band removed therefrom.

18. The improvement according to claim 11, wherein said sixth means includes means for illuminating said hologram recorded on said hologram recording medium with a reconstructing beam of light which contains only said predetermined spatial frequency band.

19. The improvement according to claim 18, wherein said predetermined spatial frequency band corresponds to at least one lower frequency component so that said first beam, which is directed onto said object, contains higher order frequency components exclusive of said at least one lower order frequency component, and said reconstructing beam contains said at least one lower order frequency component exclusive of said higher order frequency components.

20. The improvement according to claim 19, wherein said at least one lower order frequency component corresponds to the 0th order component.

* * * * *